(12) United States Patent
Barry, IV et al.

(10) Patent No.: US 8,613,258 B1
(45) Date of Patent: Dec. 24, 2013

(54) WINDOW-BASED FLAG SUPPORT

(76) Inventors: George Barry, IV, Williamston, SC (US); Andrew Weedon, Williamston, SC (US)

(*) Notice: Subject to any disclaimer, the term of this patent is extended or adjusted under 35 U.S.C. 154(b) by 356 days.

(21) Appl. No.: 13/042,486

(22) Filed: Mar. 8, 2011

(51) Int. Cl.
*G09F 17/00* (2006.01)
*G09F 21/04* (2006.01)
*B60R 13/00* (2006.01)

(52) U.S. Cl.
USPC ........................................ 116/28 R; 116/173

(58) Field of Classification Search
USPC ................ 116/28 R, 173; 40/591, 592
See application file for complete search history.

(56) References Cited

U.S. PATENT DOCUMENTS

| | | | |
|---|---|---|---|
| 3,715,821 A | 2/1973 | Hawes | |
| 3,762,360 A * | 10/1973 | Hawes | 116/28 R |
| 4,455,006 A * | 6/1984 | Aaserude | 248/205.6 |
| 4,519,153 A * | 5/1985 | Moon et al. | 40/591 |
| 4,583,310 A * | 4/1986 | Seiler | 40/592 |
| 4,650,147 A | 3/1987 | Griffin | |
| 4,976,410 A * | 12/1990 | Tomaiuolo | 248/514 |
| 4,986,209 A | 1/1991 | Spica | |
| 5,226,792 A | 7/1993 | Darago | |
| 5,233,938 A | 8/1993 | Lalo | |
| D476,915 S | 7/2003 | Blalock | |
| 7,878,139 B1 * | 2/2011 | Karnes et al. | 116/28 R |
| 2004/0134410 A1 * | 7/2004 | Tal | 116/28 R |
| 2005/0237165 A1 * | 10/2005 | Shimoni | 340/425.5 |
| 2005/0263060 A1 * | 12/2005 | Armstrong | 116/28 R |

FOREIGN PATENT DOCUMENTS

| | | | | |
|---|---|---|---|---|
| CN | 201041726 Y * | 3/2008 | | G09F 17/00 |
| DE | 29616507 U1 * | 5/1997 | | G09F 17/00 |
| DE | 29704224 U1 * | 5/1997 | | G09F 17/00 |
| DE | 29706737 U1 * | 6/1997 | | G09F 17/00 |
| DE | 29722461 U1 * | 3/1998 | | G09F 17/00 |

* cited by examiner

*Primary Examiner* — R. A. Smith

(57) ABSTRACT

The window-based flag support is an improved flag support that secures to a window of a vehicle in order to support a small flag there from. The flag support has an elongated body so as to accommodate window sun visors located adjacent to said window. The flag support has an elongated body that extends well below traditional flag supports, and of which provides clearance to window sun visors. An alternative embodiment includes in adjustable flag support in which the distance spanning the clip and the base of the flag mast can be adjusted to accommodate differently-sized window sun visors.

6 Claims, 6 Drawing Sheets

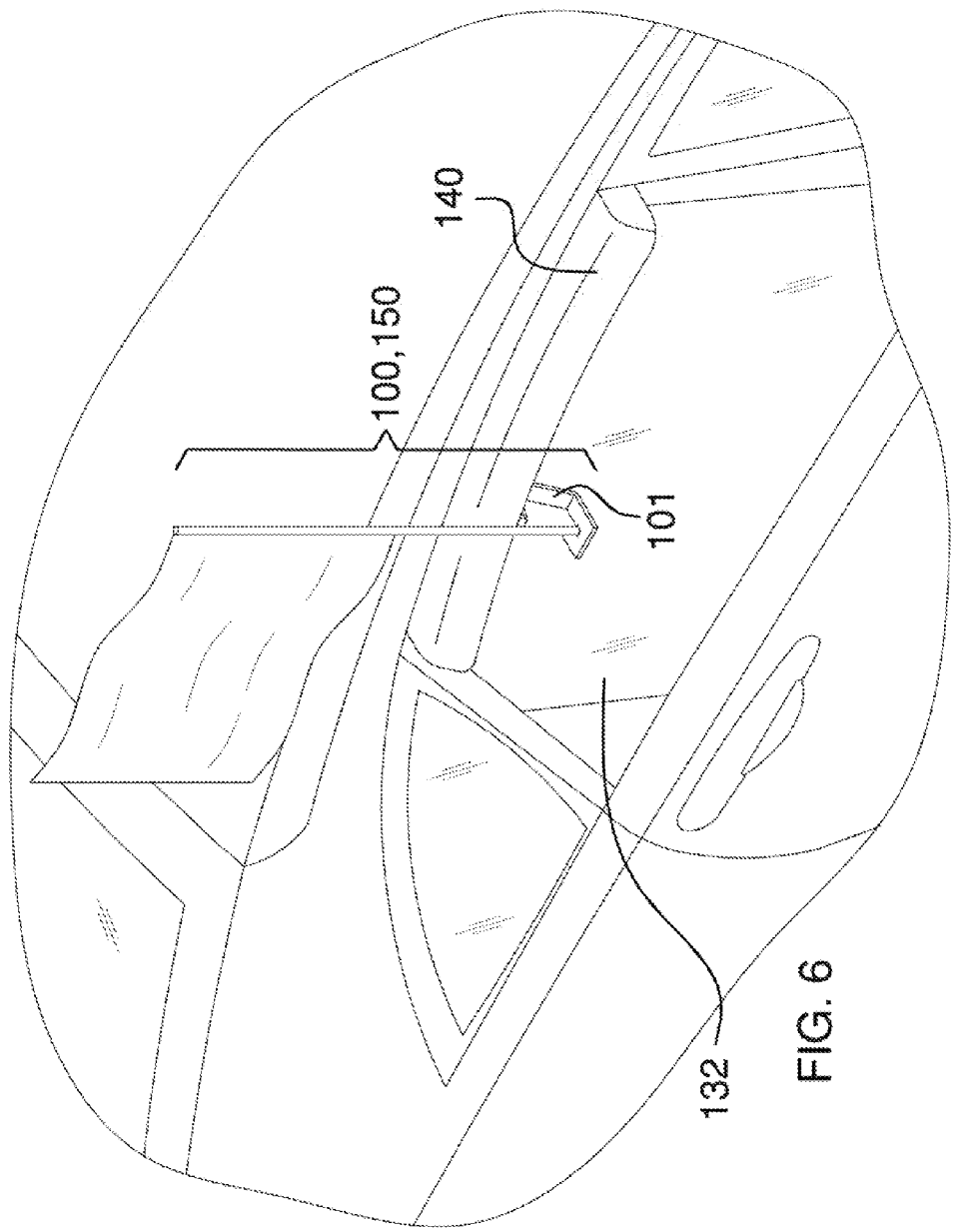

WINDOW-BASED FLAG SUPPORT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of car flags, more specifically, a flag support that attaches to a car window, and of which is modified to accommodate window vent visors.

Within the realm of professional or college football, fans often drive near and far to see their favorite team play. In these situations, fans will often use a vehicle to indorse their team by extending a window-supported flag assembly to extend and proudly display the team's logo. These window-supported flag assemblies are known in the art, and have one significant shortcoming, which is that they do not work on car windows that have a window sun visor mounted thereto. The window sun visor is an object that is mounted along an upper, edge of said window and of which provides both shade to an occupant, but also acts as a wind blocking mechanism to windows that are rolled down a couple of inches.

That being the case, there is a need for a modified flag support that can provide clearance around the window sun visor while simultaneously securely supporting a flag there from. The presently disclosed device accomplishes these requirements by not only accommodating a window sun visor, but by also providing an embodiment that can adjust to accommodate window sun visors of differing sizes.

B. Discussion of the Prior Art

As will be discussed immediately below, no prior art discloses a flag support for a small flag wherein the flag support includes a clip that clips onto a top edge of a window of a vehicle, and of which said window is subsequently rolled up to secure said flag support thereto; wherein a flag mast extends from a bottom portion of the flag support; wherein the flag mast extends vertically and of which a flag attaches thereon; wherein the flag support is elongated in order to accommodate window sun visors adjacent thereto; wherein an alternative embodiment includes a flag support with an adjustable frame that can adjust in length in order to accommodate window sun visors of differing sizes.

The Lalo U.S. Pat. No. 5,233,938 discloses a vehicle flag system that includes a flag, a flag mast, and a window mount. However, the flag system does not teach or disclose an elongated flag support that is designed to accommodate window sun visors, and does not teach a flag support that can adjust the overall length in order to accommodate window sun visors of differing sizes.

The Spica U.S. Pat. No. 4,986,209 discloses an emergency distress signal, including a substantially "S" shaped channel member with one leg of the channel being insertable over the side glass of an automobile vehicle, to be entrapped between the side glass and the window channel, and the other leg of the "S" shaped channel member holding, in combination with a rod locator means, a collapsible flagstaff having an emergency distress flag attached thereto. However, the channel of the signal is not an elongated body that can accommodate window sun visors and yet provide a flag mast onto which a flag is supported.

The Hawes U.S. Pat. No. 3,715,821 discloses a sign assembly for use on a vehicle, which includes a bracket that would take the sign away from the window frame. Again, the sign assembly teaches a flag support of a fixed length, which is not adapted for use with window sun visors and of which may include an adjustable frame to accommodate window sun visors of differing sizes.

The Griffin U.S. Pat. No. 4,650,147 discloses a flagstaff for alternative uses that includes an elongated pole with fasteners for attaching a flag to the pole and a bracket for use in selectively attaching the flag to an automobile vehicle. Again, the flagstaff teaches a flag support of a fixed length, which is not adapted for use with window sun visors and of which may include an adjustable frame to accommodate window sun visors of differing sizes.

The Darago U.S. Pat. No. 5,226,792 discloses a distress flag for a vehicle with the flag being made of foldable material that uses magnetized weights affixed to edges of the distress flag to pull it down to properly display the message in use. However, the distress flag is not attached to a flag mast extending vertically from a flag support, which can accommodate and provide clearance around a window sun visor.

The Blalock U.S. Pat. No. Des. 476,915 illustrates an ornamental design for a window-mountable flag and light, which does not teach or disclose a flag support that can provide clearance to a window sun visor via an elongated body that may include an adjustable means integrated therein.

While the above-described devices fulfill their respective and particular objects and requirements, they do not describe a flag support for a small flag wherein the flag support includes a clip that clips onto a top edge of a window of a vehicle, and of which said window is subsequently rolled up to secure said flag support thereto; wherein a flag mast extends from a bottom portion of the flag support; wherein the flag mast extends vertically and of which a flag attaches thereon; wherein the flag support is elongated in order to accommodate window sun visors adjacent thereto; wherein an alternative embodiment includes a flag support with an adjustable frame that can adjust in length in order to accommodate window sun visors of differing sizes. In this regard, the window-based flag support departs from the conventional concepts and designs of the prior art.

SUMMARY OF THE INVENTION

The window-based flag support is an improved flag support that secures to a window of a vehicle in order to support a small flag there from. The flag support has an elongated body so as to accommodate window sun visors located adjacent to said window. The flag support has an elongated body that extends well below traditional flag supports, and of which provides clearance to window sun visors. An alternative embodiment includes in adjustable flag support in which the distance spanning the clip and the base of the flag mast can be adjusted via adjusting means to accommodate differently-sized window sun visors.

An object of the invention is to provide a flag support for a vehicle window, which has an elongated body that provides clearance for a window sun visor.

A further object of the invention is to provide a flag support that has an adjusting means that enables the flag support to adjust in overall length in order to provide clearance around differently-sized window sun visors.

A further object of the invention is to provide a flag support that provides a snug and secure fit onto a window of a vehicle.

These together with additional objects, features and advantages of the window-based flag support will be readily apparent to those of ordinary skill in the art upon reading the following detailed description of presently preferred, but nonetheless illustrative, embodiments of the window-based flag support when taken in conjunction with the accompanying drawings.

In this respect, before explaining the current embodiments of the window-based flag support in detail, it is to be understood that the window-based flag support is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the window-based flag support.

It is therefore important that the claims be regarded as including such equivalent construction insofar as they do not depart from the spirit and scope of the window-based flag support. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 6 illustrates a top, perspective view of the window-based flag support installed on a window, and working in conjunction with a window sun visor.

DETAILED DESCRIPTION OF THE EMBODIMENT

Figure 1:
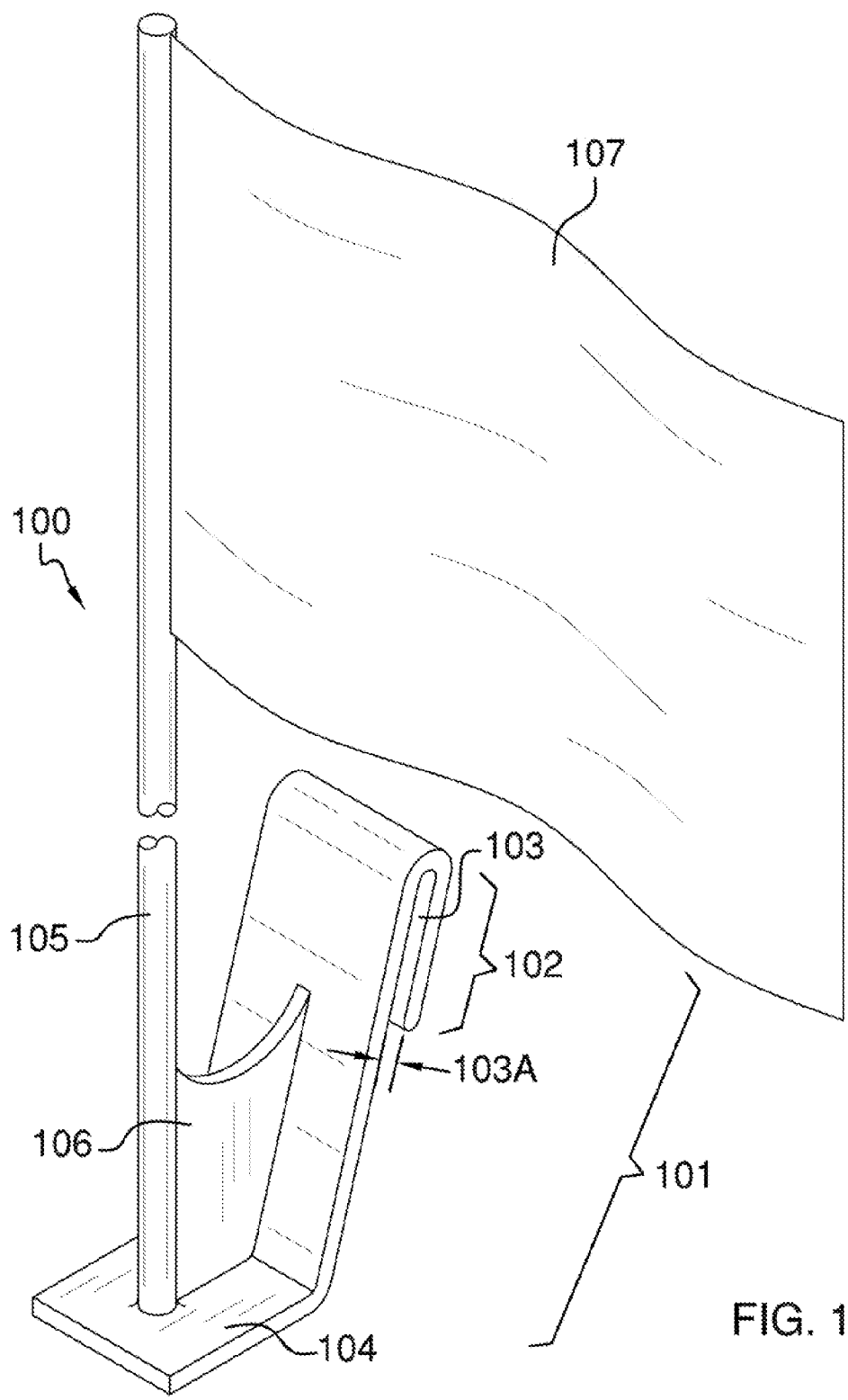
FIG. 1 illustrates a perspective view of the window-based flag support by itself and with a flag attached to the flag mast, which is broken to specify an, undefined length.
Figure 2:
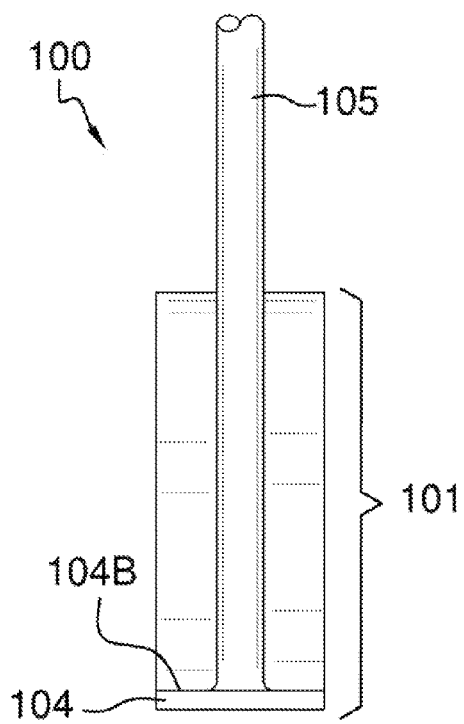
FIG. 2 illustrates a front view of the flag support of the window-based flag support.
Figure 3:
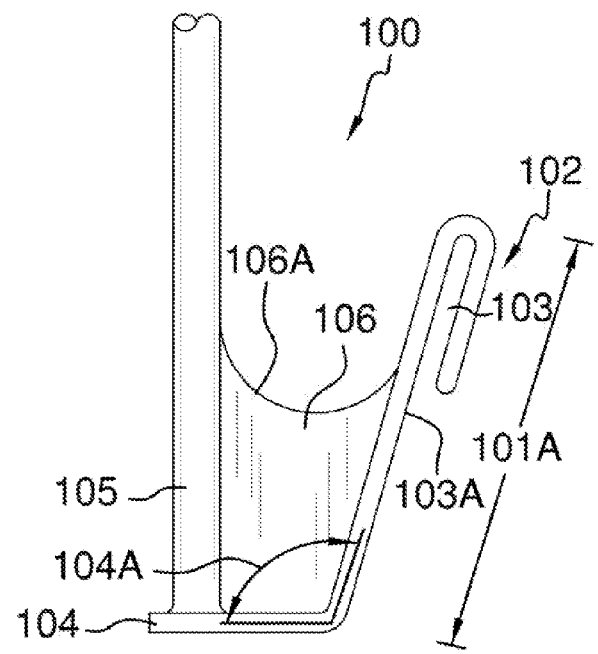
FIG. 3 illustrates a side view of the flag support, which details the shape of a ridge formed between the flag support and a bottom portion of the flag mast.
Figure 4:
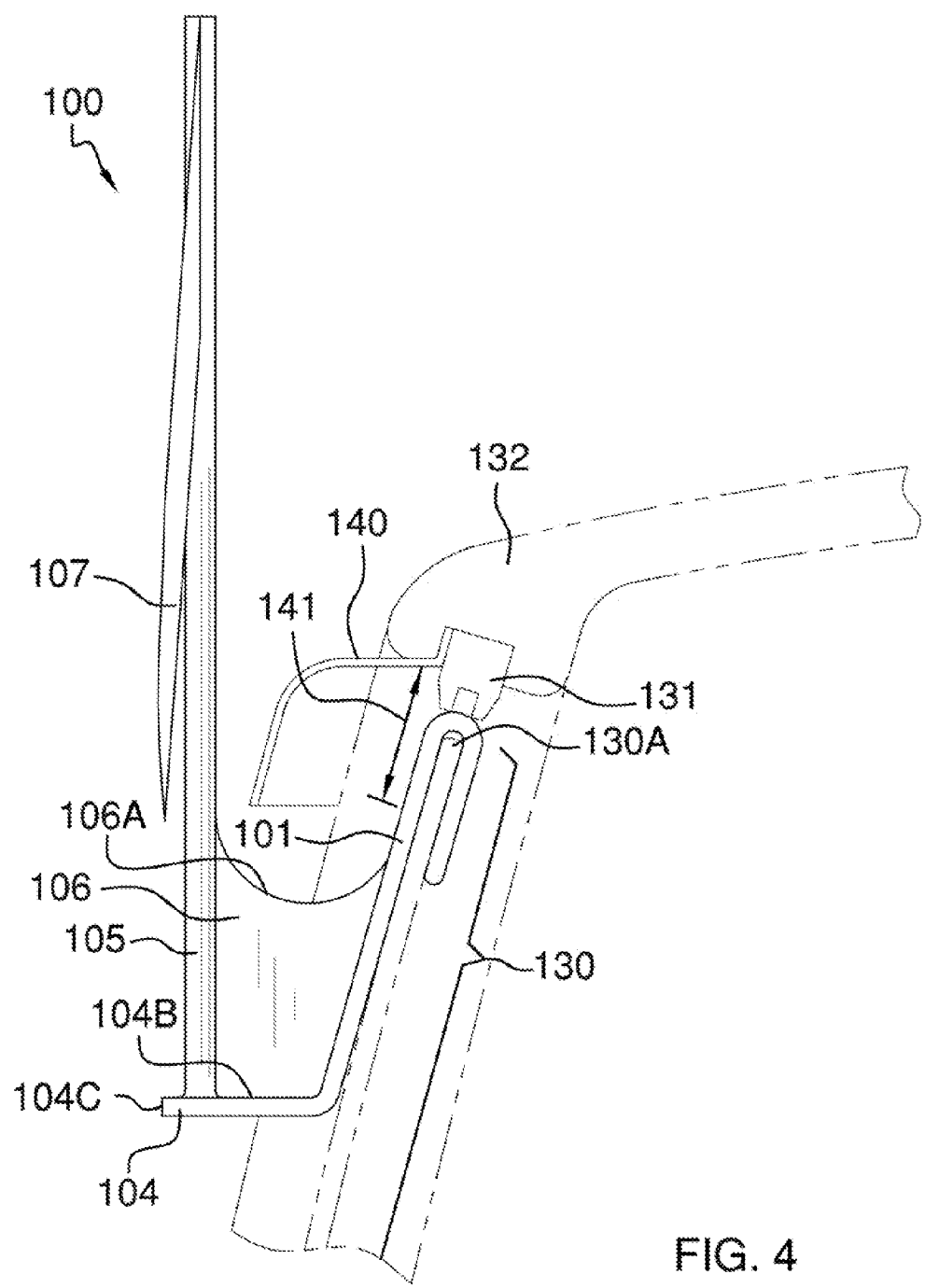
FIG. 4 illustrates a side view of the window-based flag support installed on a window in which the ridge is located beneath a window sun visor of the window.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not, intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-6. A window-based flag support 100 (hereinafter invention) includes a flag support 101 further defined by a clip 102 that is located at a top end of the flag support 101. The clip 102 is essentially a 180-degree curve in the flag support 101, which provides an open-ended slot 103 having a width 103A. The open-ended slot 103 is obviously for hanging the flag support 101 onto a top edge 130A of a window 130. The window 130 is rolled up to secure the clip 102 between the top edge 130A of the window 130 and a gasket 131 of a vehicle 132.

A window sun visor 140 is usually installed on an outer side of the gasket 131, and extends away from and down the window 130 in order to provide both shade to and a wind break when said window 130 is slightly lowered. The window sun visor 140 has a drop distance 141, which is that which the invention 100 shall provide clearance to in order for the invention 100 to work around the window sun visor 140. In other words, the drop distance 141 is the length by which the flag support 101 shall overcome in order to work as a flag support and also to not impede use of the window sun visor 140.

The flag support 101 has a main body 101A, which extends down from the clip 102, and connects to a bottom end 104. The bottom end 104 defines a bottom of the flag support 101. The main body 101A has an elongated length over flag supports of the prior art, and more particularly has an overall length that accommodates the drop distance 141 of the window sun visor 140. The bottom end 104 forms an angle 104A with respect to the main body 101A. A flag mast 105 extends vertically from a top surface 104B of the bottom end 104. The flag mast 105 extends vertically for an undefined length, and also is positioned at an outer, edge 104C of the bottom end 104.

A ridge member 106 attaches between both the flag mast 105 and the flag support 101. The ridge member 106 includes a curved edge 106A, which is curved downward so as to provide clearance for the window sun visor 140. The ridge member 106 is designed to provide support for the flag mast 105. Obviously, a flag 107 attaches to the flag past 105.

Figure 5A:
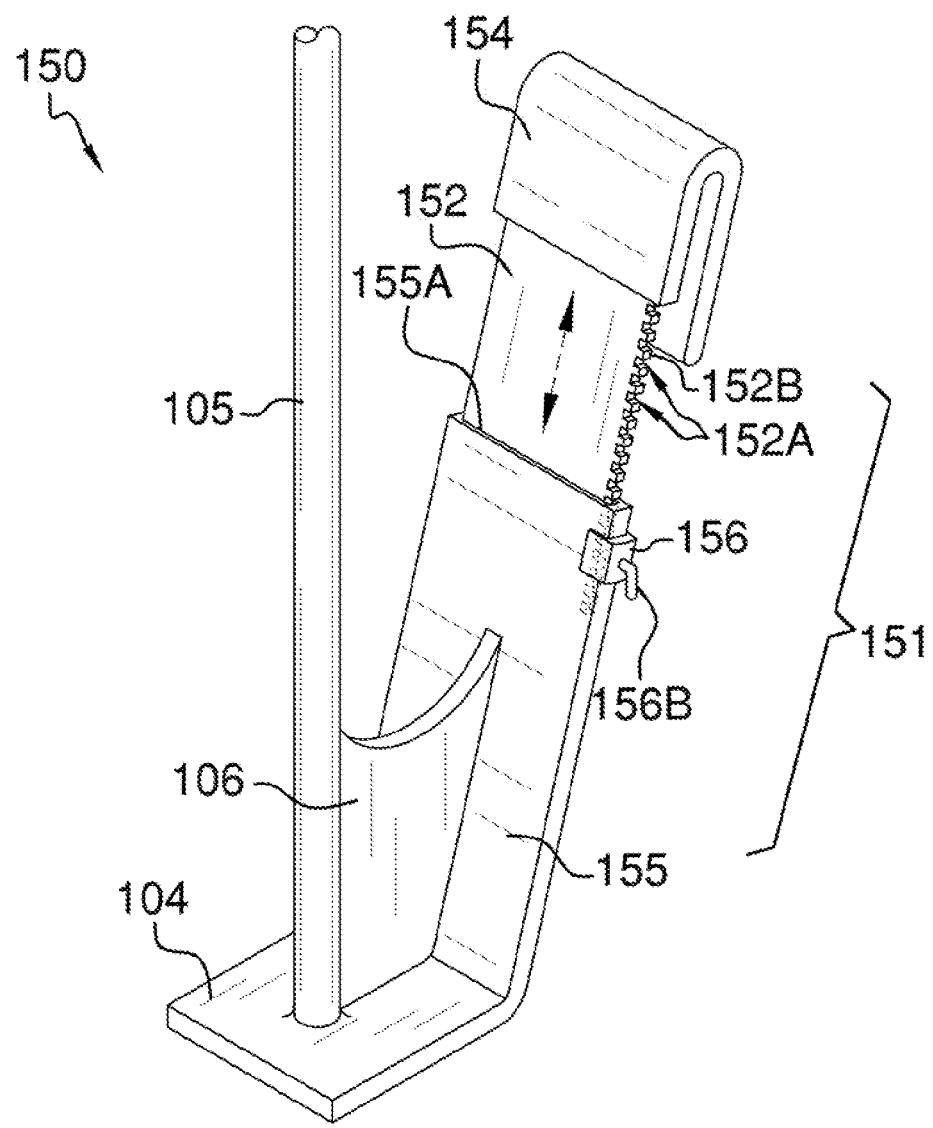
FIG. 5A illustrates a perspective view of the alternative embodiment of the window-based flag support in which an arrow indicates movement of the clip portion of the flag support being extended and retracted with the remaining portion of the flag support.
Figure 5B:
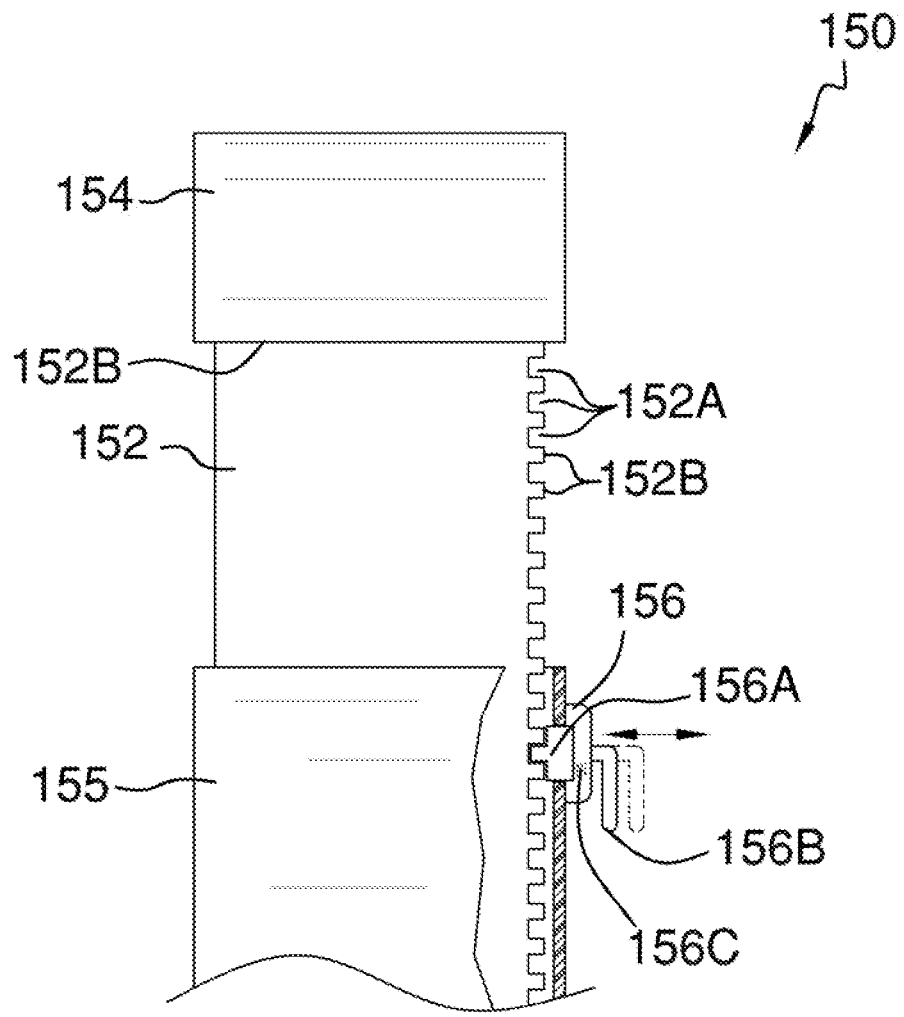
FIG. 5B illustrates a front view of a portion of the alternative embodiment of the flag support, and depicting the adjusting means, which enable the overall length of the flag support to be adjusted.

Referring to FIGS. 5A-5B, an alternative embodiment 150 includes all of the components of the invention 100 described above with one main deviation, which will be described immediately below. The flag support 101 includes an adjusting means 151 that is comprised of a vertical slide 152 having a plurality of notches 152A extending down a first side 152B of the vertical slide 152. The main body 101A is divided into first portion 154 and a second portion 155. The vertical slide 152 attaches to the first portion 154 at a top end 152B.

The second portion 155 includes a cavity 155A that enables the vertical slide 152 to enter into and slide up and down therein. The second portion 155 includes a locking means 156 on a side adjacent the notches 152A. The locking means 156 includes a spring-loaded lock 156A that is biased inwardly via a spring 156C so as to engage upon one of the notches 152A. The spring-loaded lock 156A includes an arm 156B, which enables an end user to retract the lock 156A in order to release the vertical slide 152 therein, and adjust the overall length of the main body 101A. It shall be noted that the adjusting means 151 enables adjustment of the overall length of the main body 101A in order to provide clearance to differently-sized window sun visors 140 having different drop distances 141.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A window-based flag support comprising:
    a flag support having a clip on a top end, which is engaged between a top edge of a window and a gasket of a vehicle;
    wherein the flag support has a main body of a length providing clearance to a window sun visor that extends down from said window to span a drop distance;
    wherein the flag support includes a flag mast that extends vertically to support a flag thereon;
    wherein the main body is further defined as a first portion and a second portion; wherein an adjusting means is integrated into the main body such that the overall length of the main body can be adjusted to accommodate differently sized window sun shades having different drop distances;
    wherein the adjusting means is comprised of a vertical slide having a plurality of notches extending down a first side of the vertical slide;
    wherein the vertical slide attaches to the first portion at a top end; wherein the second portion includes a cavity that enables the vertical slide to enter into and slide up and down therein; wherein the second portion includes a locking means on a side adjacent the notches;
    wherein the locking means includes a spring-loaded lock that is biased inwardly via a spring so as to engage upon one of the notches; wherein the spring-loaded lock includes an arm, which enables retraction of the lock in order to release the vertical slide therein, and adjust the overall length of the main body.

2. The window-based flag support as described in claim 1 wherein the flag support includes a bottom end at a bottom of said flag support; wherein the bottom end extends at an angle from the main body and the flag mast extends vertically from a top surface of the bottom end.

3. The window-based flag support as described in claim 1 wherein a ridge member attaches between both the flag mast and the flag support.

4. The window-based flag support as described in claim 3 wherein the ridge member includes a curved edge that is curved downward so as to provide clearance for the window sun visor.

5. A window-based flag support comprising:
    a flag support having a clip on a top end, which is engaged between a top edge of a window and a gasket of a vehicle;
    wherein the flag support has a main body of a length providing clearance to a window sun visor that extends down from said window to span a drop distance;
    wherein the flag support includes a flag mast that extends vertically to support a flag thereon;
    wherein the flag support includes a bottom end at a bottom of said flag support; wherein the bottom end extends at an angle from the main body and the flag mast extends vertically from a top surface of the bottom end;
    wherein a ridge member attaches between both the flag mast and the flag support;
    wherein the main body is further defined as a first portion and a second portion; wherein an adjusting means is integrated into the main body such that the overall length of the main body can be adjusted to accommodate differently sized window sun shades having different drop distances;
    wherein the adjusting means is comprised of a vertical slide having a plurality of notches extending down a first side of the vertical slide;
    wherein the vertical slide attaches to the first portion at a top end; wherein the second portion includes a cavity that enables the vertical slide to enter into and slide up and down therein; wherein the second portion includes a locking means on a side adjacent the notches;
    wherein the locking means includes a spring-loaded lock that is biased inwardly via a spring so as to engage upon one of the notches; wherein the spring-loaded lock includes an arm, which enables retraction of the lock in order to release the vertical slide therein, and adjust the overall length of the main body.

6. The window-based flag support as described in claim 5 wherein the ridge member includes a curved edge that is curved downward so as to provide clearance for the window sun visor.

* * * * *